(12) United States Patent
Huang et al.

(10) Patent No.: US 12,368,297 B2
(45) Date of Patent: Jul. 22, 2025

(54) LOAD SWITCH CIRCUIT

(71) Applicant: ASUSTeK COMPUTER INC., Taipei (TW)

(72) Inventors: Jia-Ching Huang, Taipei (TW); Hsiang-Jui Hung, Taipei (TW); Min-Hou Kuo, Taipei (TW); Bo-Siang Cheng, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 453 days.

(21) Appl. No.: 17/985,122

(22) Filed: Nov. 10, 2022

(65) Prior Publication Data

US 2024/0047965 A1 Feb. 8, 2024

(30) Foreign Application Priority Data

Aug. 2, 2022 (TW) .................................. 111128878

(51) Int. Cl.
*H02H 9/02* (2006.01)
*H02H 1/00* (2006.01)

(52) U.S. Cl.
CPC ............ *H02H 9/02* (2013.01); *H02H 1/0007* (2013.01)

(58) Field of Classification Search
CPC ........ H03K 17/12; H03K 17/687; H02H 9/02; H02H 1/0007
See application file for complete search history.

(56) References Cited

U.S. PATENT DOCUMENTS

| | | | |
|---|---|---|---|
| 9,467,136 B1 | 10/2016 | Nguyen | |
| 2011/0128659 A1 | 6/2011 | Sadate et al. | |
| 2017/0170655 A1* | 6/2017 | Nguyen | ........... H03K 17/08122 |
| 2022/0163935 A1* | 5/2022 | Wang | ...................... H02H 9/02 |

FOREIGN PATENT DOCUMENTS

| | | | |
|---|---|---|---|
| CN | 106169925 | | 11/2016 |
| CN | 105591538 | | 6/2018 |
| CN | 105577152 | | 10/2018 |
| CN | 210007434 | | 1/2020 |
| CN | 118630896 A | * | 9/2024 |
| CN | 221995139 U | * | 11/2024 |

OTHER PUBLICATIONS

UPI SEMI uP7567 Ultra-Low RDS(ON) Power Distribution Switch with Adjustable Soft Start, Current Limit, and Current Monitoring [retrieved on Feb. 2022]. Retrieved from the Internet: <URL:https://datasheet4u.com/pdf-down/u/P/7/uP7567-uPISemiconductor.pdf> (Year: 2022).*

* cited by examiner

*Primary Examiner* — Jared Fureman
*Assistant Examiner* — Nicolas Bellido
(74) *Attorney, Agent, or Firm* — JCIPRNET

(57) ABSTRACT

A load switch circuit is provided. The load switch circuit includes a control chip and a current limit protection circuit. The control chip is operated at a power supply voltage, configured to receive an input voltage, and controlled by an enable signal to provide an output voltage and an output current to a load. The current limit protection circuit is configured to provide a current limit control voltage to a current limit and low power pin of the control chip, so that the control chip may adjust a current limit of the output current.

16 Claims, 3 Drawing Sheets

LOAD SWITCH CIRCUIT

CROSS-REFERENCE TO RELATED APPLICATION

This application claims the priority benefit of Taiwan application serial no. 111128878, filed on Aug. 2, 2022. The entirety of the above-mentioned patent application is hereby incorporated by reference herein and made a part of this specification.

BACKGROUND

Technical Field

The disclosure relates to a switch circuit and more particularly relates to a load switch circuit controlled by a control chip.

Description of Related Art

Conventional power load switches are mainly categorized into two types. The first type is a simple load switch integrated circuit (IC) which is merely able to support low amperage of current, and a drain-source on resistance (Rds(on)) of a metal oxide semiconductor field effect transistor (MOSFET) in the IC is relatively high, thus resulting in a large voltage drop and the lack of additional protection mechanisms. The second type is a load switch composed of passive elements, which is mainly composed of a switch transistor and a charge pump. Issues of insufficient current amperage that may be supported and the large voltage drop may be solved by selecting materials and components of the switch transistor, while the disadvantage lies in an increase in the number of components used in the load switch and an increase in the area occupied by the load switch.

However, both types of the aforesaid conventional power load switches require additional combinations of additional external passive elements (such as resistors, transistors, capacitors, and so on) to achieve various protection mechanisms (e.g., power state monitor, current monitor, and so on). Errors resulting from the external elements may easily deteriorate the accuracy and characteristics of the conventional power load switches.

SUMMARY

According to an aspect of this disclosure, a load switch circuit is provided. The load switch circuit includes a control chip and a current limit protection circuit. The control chip is operated at a power supply voltage, configured to receive an input voltage, and controlled by an enable signal to provide an output voltage and an output current to a load. The current limit protection circuit us coupled to the control chip and configured to provide a current limit control voltage to a current limit and low power pin of the control chip, so that the control chip adjusts a current limit of the output current.

In view of the above, it is not necessary for the load switch circuit provided in one or more embodiments of the disclosure to be combined with a significant amount of external passive elements for accomplishing various protection mechanisms, and the number of elements used in the load switch circuit and the area occupied by the load switch circuit may be reduced. Besides, the load switch circuit provided herein may be prevented from being affected by errors resulting from the external elements, and the current amperage which may be supported by the load switch circuit is increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
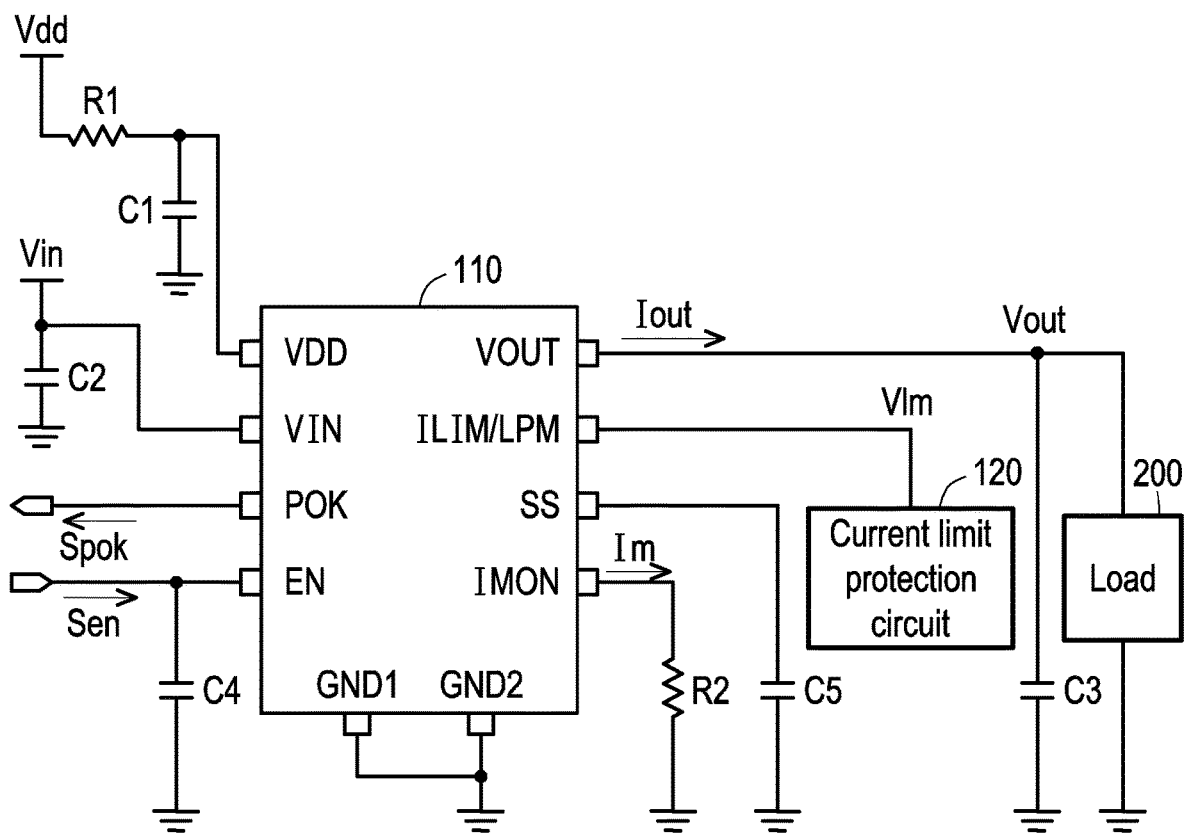
FIG. 1 is a schematic circuit view of a load switch circuit according to an embodiment of the disclosure.

Reference is now made in detail to exemplary embodiments of the disclosure, and examples of the exemplary embodiments are described in the accompanying drawings. Whenever possible, the same reference numbers are used in the drawings and descriptions to indicate the same or similar parts.

With reference to FIG. 1, a load switch circuit 100 provided in this embodiment may serve as a power load switch. As shown in FIG. 1, the load switch circuit 100 includes a control chip 110, a current limit protection circuit 120, a first resistor R1 to a second resistor R2, and a first capacitor C1 to a fifth capacitor C5.

The control chip 110 is constituted by, for instance, an integrated circuit (IC). The control chip 110 is operated at a power supply voltage Vdd, configured to receive an input voltage Vin, and provides an output voltage Vout and an output current Iout to a load 200 according to an enable signal Sen. The load 200 is, for instance, any electronic element or device and equipment that consumes active power on a circuit, which should however not be construed as a limitation in the disclosure.

To be specific, the control chip 110 may be controlled by the enable signal Sen and may then be turned on or turned off. For instance, when the enable signal Sen is at a high logic level, the control chip 110 may be in an on state, so that the control chip 110 may provide the output voltage Vout and the output current Tout to the load 200 according to the input voltage yin. When the enable signal Sen is at a low logic level, the control chip 110 may be in an off state, so that the control chip 110 stops providing the output voltage Vout and the output current Tout to the load 200. In other embodiments, note that the enable signal Sen may also control the state of the switch according to the logic level opposite to what is described above, which should however not be construed as a limitation in the disclosure.

In this embodiment, the control chip 110 has a power pin VDD, an input pin VIN, a power ready pin POK, an enable pin EN, an output pin VOUT, a current limit and low power pin ILIM/LPM, a soft-start pin SS, a monitor pin IMON, and ground pins GND1 and GND2. Functions of each of the pins are explained below.

Basically, in order for the control chip 110 to be operated normally, the control chip 110 receives a power supply voltage Vdd required for its operation through the power pin VDD, and the control chip 110 is coupled to a ground potential (0V) through the ground pins GND1 and GND2. In other words, the control chip 110 is operated at the power supply voltage Vdd. As shown in FIG. 1, a first end of first resistor R1 is coupled to the power supply voltage Vdd, and a second end of the first resistor R1 is coupled to the power pin VDD. A first end of the first capacitor C1 is coupled to the power pin VDD, and a second end of the first capacitor C1 is coupled to the ground potential (0V). A value of the power supply voltage Vdd is, for instance, 3.3V to 5V, a value of the first resistor R1 is, for instance, 1 ohm (Ω), and a value of the first capacitor C1 is, for instance, 0.1 microfarad (μF).

The control chip 110 receives the input voltage Vin through the input pin VIN. As shown in FIG. 1, a first end of the second capacitor C2 is coupled to the input pin VIN, and a second end of the second capacitor C2 is coupled to the ground potential. A value of the second capacitor C2 is, for instance, 10 μF. A value of the input voltage Vin is within a range not exceeding the value of the power supply voltage Vdd.

The control chip 110 outputs the output voltage Vout and the output current Iout to the load 200 through the output pin VOUT. As shown in FIG. 1, a first end of the third capacitor C3 is coupled to the output pin VOUT, and a second end of the third capacitor C3 is coupled to the ground potential. A value of the third capacitor C3 is, for instance, 1 μF.

The control chip 110 indicates a status of the output voltage Vout by outputting a power ready signal Spok through the power ready pin POK. For instance, when the power ready signal Spok is at a high logic level, it indicates that the output voltage Vout of the control chip 110 is in a good condition and able to be used by the load 200 (e.g., the output voltage Vout has reached 90% of the input voltage Vin). When the power ready signal Spok is at a low logic level, it indicates that the output voltage Vout of the control chip 110 is in a poor condition. In other embodiments, note that the power ready signal Spok may also indicate the status of the output voltage Vout according to the logic level opposite to what is described above, which should however not be construed as a limitation in the disclosure.

To control an on state and an off state between the input pin VIN and the output pin VOUT, the enable signal Sen input may be input to the enable pin EN. The control chip 110 receives the enable signal Sen through the enable pin EN. As shown in FIG. 1, a first end of the fourth capacitor C4 is coupled to the enable pin EN, and a second end of the fourth capacitor C4 is coupled to the ground potential. A value of the fourth capacitor C4 is, for instance, 0.01 μF.

The current limit and low power pin ILIM/LPM of the control chip 110 is coupled to the current limit protection circuit 120. The current limit protection circuit 120 is configured to provide the current limit control voltage Vlm to the current limit and low power pin ILIM/LPM, so that the control chip 110 may adjust the current limit of the output current Tout according to the current limit control voltage Vlm. Specifically, the control chip 110 may select a designated range from a plurality of predetermined current limit ranges according to the current limit control voltage Vlm as a current protection point, so as to limit the amount of the output current Tout.

Figure 2:
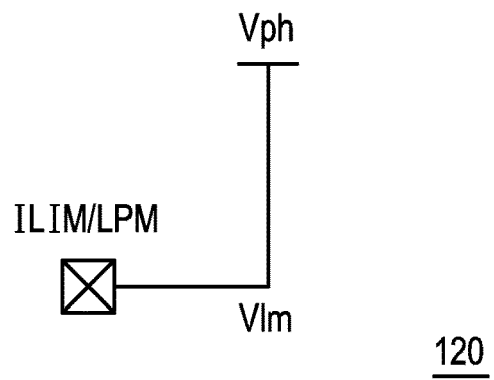
FIG. 2 is a schematic circuit view of a current limit protection circuit according to an embodiment of the disclosure.
Figure 3:
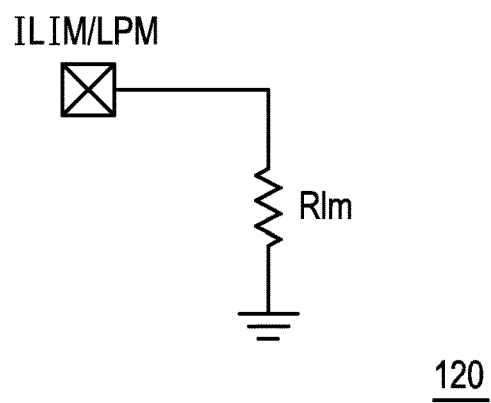
FIG. 3 is a schematic circuit view of a current limit protection circuit according to an embodiment of the disclosure.
Figure 4:
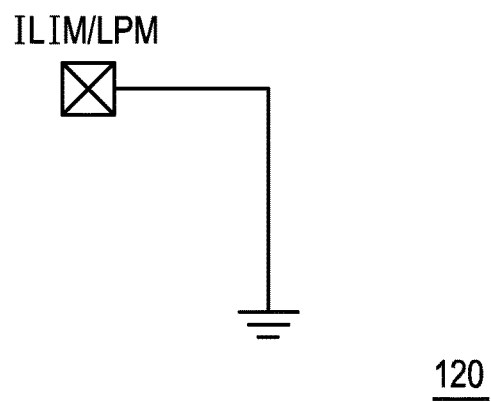
FIG. 4 is a schematic circuit view of a current limit protection circuit according to an embodiment of the disclosure.

In particular, in a design stage of the circuit structure, a designer may configure the circuit structure of the current limit protection circuit 120 according to actual needs, so as to select the designated range as the current protection point. For instance, FIG. 2 to FIG. 4 illustrate three embodiments of the circuit structure of the current limit protection circuit 120, which may correspond to a first current limit range to a third current limit range, respectively. The first current limit range to the third current limit range respectively refer to limitation of the output current Iout to the current protection points of 7 amperes (amps), 5 amps, and 3 amps, which should however not be construed as a limitation in the disclosure.

First, in FIG. 2, the current limit protection circuit 120 pulls up the current limit control voltage Vlm to a pull-up voltage Vph, so the control chip 110 receives the current limit control voltage Vlm that is pulled to the pull-up voltage Vph through the current limit and low power pin ILIM/LPM. At this time, the control chip 110 selects the first current limit range as the designated range and accordingly limits the amount of the output current Tout (i.e., limiting the output current Tout to be equal to or less than 7 amps). A value of the pull-up voltage Vph is, for instance, 3.3 volts (V) to 5 V (e.g., approximately the same as the value of the power supply voltage Vdd). In an embodiment of the disclosure, the current limit protection circuit 120 may also leave the current limit control voltage Vlm floating and allow the control chip 110 to select the first current limit range as the designated range.

Next, in FIG. 3, the current limit protection circuit 120 includes a current limit resistor Rlm. A first end of the current limit resistor Rlm is coupled to the current limit and low power pin ILIM/LPM, and a second end of the current limit resistor Rlm is coupled to the ground potential. At this time, the control chip 110 selects the second current limit range as the designated range and accordingly limits the amount of the output current Iout (i.e., limiting the output current Iout to be equal to or less than 5 amps). A value of the current limit resistor Rlm is, for instance, 1 milliohm (mΩ).

Finally, in FIG. 4, the current limit protection circuit 120 directly couples the current limit and low power pin ILIM/LPM to the ground potential, and therefore the control chip 110 receives the ground potential through the current limit and low power pin ILIM/LPM. At this time, the control chip 110 selects the third current limit range as the designated range and accordingly limits the amount of the output current Iout (i.e., limiting the output current Iout to be equal to or less than 3 amps).

When the control chip 110 is practically applied, the control chip 110 may perform a sampling operation on the current limit control voltage Vlm through the current limit and low power pin ILIM/LPM within about the first 300 milliseconds after the chip is activated, so as to determine the current protection point to be used. In addition, after the current protection point is determined, the control chip 110 may also enable the function of a low power mode.

For instance, in the embodiment shown in FIG. 2, the current limit protection circuit 120 pulls up the current limit control voltage Vlm to the pull-up voltage Vph or leaves the current limit control voltage Vlm floating; after the control chip 110 selects the first current limit rage as the designated range according to the current limit control voltage Vlm, the current limit protection circuit 120 may change a connection path via the switch circuit and transmit a low power triggering signal to the current limit and low power pin ILIM/LPM from another electronic element or another device on the circuit, whereby the control chip 110 enters the low power mode.

In the low power mode, the control chip 110 is in the off state, the output voltage Vout is naturally discharged and gradually decreased, so as to reduce the power consumption of the control chip 110. When the control chip 110 is in the low power mode, note that the power ready signal Spok output by the power ready pin POK is not dropped from the high logic level, which meets the requirement of the power saving mechanism.

With reference to FIG. 1, the control chip 110 obtains a predetermined soft-start time through the soft-start pin SS, i.e., the time required for gradually raising the output voltage Vout from 0V to a rated voltage. As shown in FIG. 1, a first end of the fifth capacitor C5 is coupled to the soft-start pin SS, and a second end of the fifth capacitor C5 is coupled to the ground potential. The control chip 110 may adjust the soft-start time according to a value of the fifth capacitor C5. If the soft-start function of the control chip 110 is not enabled, note that the soft-start pin SS of the control chip 110 may be left floating. In addition, as to the settings, the value of the fifth capacitor C5 should be less than a predetermined upper-limit time of the control chip 110 within which the control chip 110 completes the soft-start function.

The control chip 110 outputs a monitor current Im through the monitor pin IMON to reflect the amount of the output current Iout. The monitor current Im may be obtained by multiplying the output current Iout by a predetermined multiplier, so that the output current Iout may be monitored through the monitor current Im. As shown in FIG. 1, a first end of the second resistor R2 is coupled to the monitor pin IMON, and a second end of the second resistor R2 is coupled to the ground potential. A value of the second resistor R2 is, for instance, 1000Ω.

Besides, in this embodiment, a plurality of protection functions may be integrated into the control chip 110, and the monitor pin IMON and an error reporting function may be integrated to notify a user of triggering an over-temperature protection, an under-voltage protection, and a short-circuit protection through the monitor pin IMON. Specifically, when the control chip 110 encounters any of the over-temperature issue, the under-voltage issue, and the short-circuit issue, the control chip 110 actively pull up the potential of the monitor pin IMON (e.g., pulling up to 3.3 V to 5 V), so as to notify that the protection mechanism has been triggered and stop providing the output voltage Vout and the output current Tout from the output pin VOUT. In this embodiment, the over-temperature issue means that a temperature of the control chip 110 is greater than a predetermined threshold temperature, the under-voltage means that the output voltage Vout is lower than the input voltage Vin by a predetermined voltage difference, and the short-circuit issue means that the control chip 110 suddenly generates a significant amount of current within a short period of time. As such, function accuracy is no longer affected by the external elements, and the accuracy of the protection function may be improved.

Based on actual design and application requirements, note that other functional pins may be added to the control chip 110, which should however not be construed as a limitation in the disclosure. In addition, the control chip 110 may have an ultra-low impedance through process optimization. The control chip 110 further includes a memory, which may record the protection mechanism triggered this time until the next restart, which is conducive to the maintenance and repair of the chip.

Figure 5:
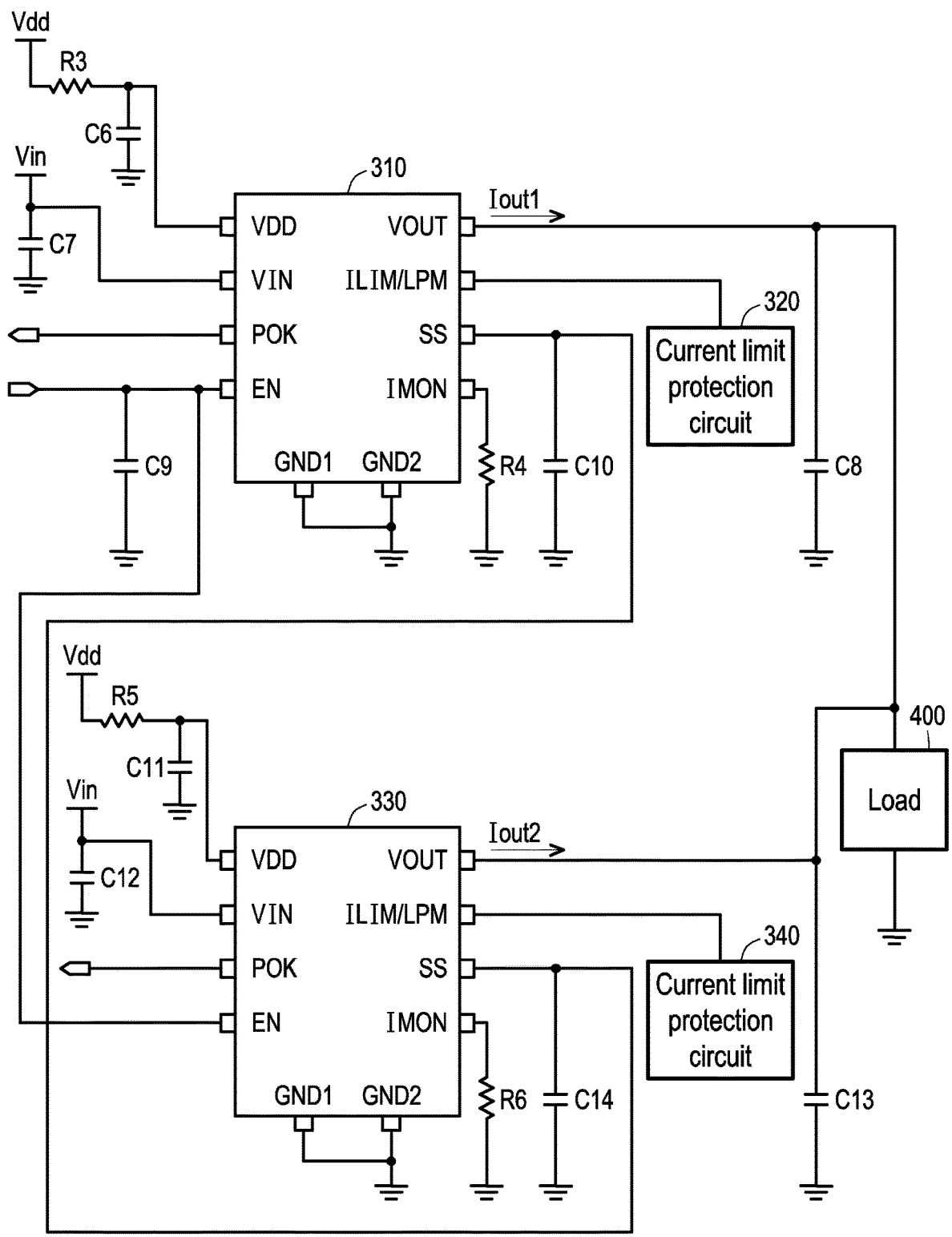
FIG. 5 is a schematic circuit view of a load switch circuit according to an embodiment of the disclosure.

In an embodiment of the disclosure, to increase the limit of the output current, two control chips may be connected in parallel and respectively provide the rated output current to the load to increase the available current amperage. As shown in FIG. 5, a load switch circuit 300 includes a control chip 310, a current limit protection circuit 320, a resistor R3 to a resistor R4, and a capacitor C6 to a capacitor C10. The coupling manner and the functions of these elements are similar to or the same as those of the control chip 110, the current limit protection circuit 120, the first resistor R1 to the second resistor R2, and the first capacitor C1 to the fifth capacitor C5 provided in the previous embodiment, which is therefore not elaborated hereinafter.

In addition, the load switch circuit 300 further includes another control chip 330, another current limit protection circuit 340, a resistor R5 to a resistor R6, and a capacitor C11 to a capacitor C14 with the same specification. The coupling manner and the functions of the resistor R5 to the resistor R6 and the capacitor C11 to the capacitor C14 are the same or similar to the coupling manner and the functions of the resistor R3 to the resistor R4, the capacitor C6 to the capacitor C8, and the capacitor C10. As shown in FIG. 5, the enable pin EN and the soft-start pin SS of the control chip 310 are coupled to the enable pin EN and soft-start pin SS of the another control chip 330. The load switch circuit 300 may receive the input voltage Vin through the input pin VIN of the control chip 310 and the input pin VIN of the control chip 330, respectively, and the load switch circuit 300 may output the output current Iout1 and the output current Iout2 to the load 400 through the output pin VOUT of the control chip 310 and the output pin VOUT of the control chip 330, respectively.

For instance, when the load is required to input a current of 10 amps, the current limit protection circuit 320 may limit the output current Iout1 to be equal to or less than 7 amps by adopting an embodiment corresponding to the first current limit range, and the current limit protection circuit 340 may limit the output current Iout2 to be equal to or less than 3 amps by adopting an embodiment corresponding to the third current limit range, so as to generate a total of 10 amps of current. As such, a plurality of control chips may be connected in parallel to support a larger amount of current amperage and achieve the function of automatic current balance, and each control chip still achieves the function of the protection mechanism described above.

To sum up, the load switch circuit provided in one or more embodiments of the disclosure may integrate various protection mechanisms into the control chip without additionally applying a significant number of external passive elements, and thus the function accuracy is no longer affected by the external elements. In addition, the load switch circuit provided in one or more embodiments of the disclosure may be flexibly applied regardless of a large amount or a small amount of current, the corresponding current protection point may be set, and the current amperage which may be supported by the load switch circuit is increased according to actual needs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A load switch circuit, comprising:
   a control chip, operated at a power supply voltage, configured to receive an input voltage, and controlled by an enable signal to provide an output voltage and an output current to a load; and
   a current limit protection circuit, coupled to the control chip and configured to provide a current limit control voltage to a current limit and low power pin of the control chip, so that the control chip adjusts a current limit of the output current.

2. The load switch circuit according to claim 1, wherein the control chip selects a designated range from a plurality of predetermined current limit ranges according to the current limit control voltage, so as to limit an amount of the output current.

3. The load switch circuit according to claim 1, wherein the current limit protection circuit pulls up the current limit control voltage to a pull-up voltage or leaves the current limit control voltage floating.

4. The load switch circuit according to claim 3, wherein after the control chip selects the designated range according to the current limit control voltage, the control chip enters a low power mode when the current limit protection circuit transmits a low power triggering signal to the current limit and low power pin.

5. The load switch circuit according to claim 1, wherein the current limit protection circuit comprises:
   a current limit resistor, having a first end coupled to the current limit and low power pin and a second end coupled to a ground potential.

6. The load switch circuit according to claim 1, wherein the current limit protection circuit directly couples the current limit and low power pin to a ground potential.

7. The load switch circuit according to claim 1, wherein the control chip further has a power pin, and the load switch circuit further comprises:
   a first resistor, having a first end coupled to the power supply voltage and a second end coupled to the power pin; and
   a first capacitor, having first end coupled to the power pin and a second is coupled to a ground potential.

8. The load switch circuit according to claim 1, wherein the control chip further has a ground pin, so as to be coupled to a ground potential.

9. The load switch circuit according to claim 1, wherein the control chip further has an input pin to receive the input voltage, and the load switch circuit further comprises:
   a second capacitor, having a first end coupled to the input pin and a second end coupled to a ground potential.

10. The load switch circuit according to claim 1, wherein the control chip further has an output pin to output the output voltage and the output current to the load, and the load switch circuit further comprises:
    a third capacitor, having a first end coupled to the output pin and a second end coupled to a ground potential.

11. The load switch circuit according to claim 1, wherein the control chip further has a power ready pin to output a power ready signal to indicate a status of the output voltage.

12. The load switch circuit according to claim 1, wherein the control chip further has an enable pin to receive the enable signal, and the load switch circuit further comprises:
    a fourth capacitor, having a first end coupled to the enable pin and a second end coupled to a ground potential.

13. The load switch circuit according to claim 1, wherein the control chip further has a soft-start pin, and the load switch circuit further comprises:
    a fifth capacitor, having a first end coupled to the soft-start pin and a second end coupled to a ground potential, and
    the control chip adjusts a soft-start time according to a capacitance value of the fifth capacitor.

14. The load switch circuit according to claim 1, wherein the control chip further has a monitor pin, and the load switch circuit further comprises:
    a second resistor, having a first end coupled to the monitor pin and a second end coupled to a ground potential, and
    the monitor pin outputs a monitor current to reflect an amount of the output current.

15. The load switch circuit according to claim 14, when the control chip encounters any of an over-temperature issue, an under-voltage issue, and a short-circuit issue, the control chip pulls up a potential of the monitor pin and stops providing the output voltage and the output current.

16. The load switch circuit according to claim 1, wherein the load switch circuit further comprises:
    another control chip, connected in parallel to the control chip,
    the control chip and the another control chip respectively provide a corresponding output current to the load, and
    an enable pin and a soft-start pin of the control chip are coupled to an enable pin and a soft-start pin of the another control chip.

* * * * *